United States Patent [19]

Mommer

[11] 4,153,735

[45] May 8, 1979

[54] LUBRICANT-BINDER ADDITIVE FOR DENSIFYING ANIMAL FEED MATERIAL

[75] Inventor: Richard P. Mommer, Loveland, Colo.

[73] Assignee: Uniscope, Inc., Johnstown, Colo.

[21] Appl. No.: 847,660

[22] Filed: Nov. 1, 1977

[51] Int. Cl.² .................................................... A23K 1/00
[52] U.S. Cl. ........................................ 426/285; 426/2; 426/72; 426/623; 426/635; 426/601; 426/807
[58] Field of Search .................. 426/2, 285, 99, 96, 426/805, 807, 302, 654, 289, 635, 607, 606, 601, 602, 512, 623, 1, 72

[56] References Cited

U.S. PATENT DOCUMENTS

| | | | |
|---|---|---|---|
| 3,010,828 | 11/1961 | Patterson et al. | 426/635 |
| 3,087,819 | 4/1963 | Harris | 426/807 X |
| 3,644,113 | 2/1972 | Lang et al. | 426/285 X |
| 3,852,483 | 12/1974 | Oborsh et al. | 426/805 X |
| 3,889,007 | 6/1975 | Gunter et al. | 426/635 X |
| 4,016,296 | 4/1977 | De Santis | 426/807 X |
| 4,018,909 | 4/1977 | Foulkes | 426/805 X |
| 4,045,585 | 8/1977 | Appleman et al. | 426/805 X |

FOREIGN PATENT DOCUMENTS

| | | | |
|---|---|---|---|
| 43-10312 | 4/1968 | Japan | 426/2 |
| 48-31788 | 10/1973 | Japan | 426/2 |
| 49-43787 | 11/1974 | Japan | 426/623 |
| 51-57565 | 5/1976 | Japan | 426/2 |
| 1349620 | 4/1974 | United Kingdom | 426/2 |

*Primary Examiner*—Kenneth M. Schor
*Attorney, Agent, or Firm*—Lackenbach, Lilling & Siegel

[57] ABSTRACT

A lubricant-binder additive composition and method for densifying particulate, granular animal feed material. The additive composition comprises a fatty acid salt, a hydrogenated lipid and a water soluble anionic polymer.

40 Claims, 1 Drawing Figure

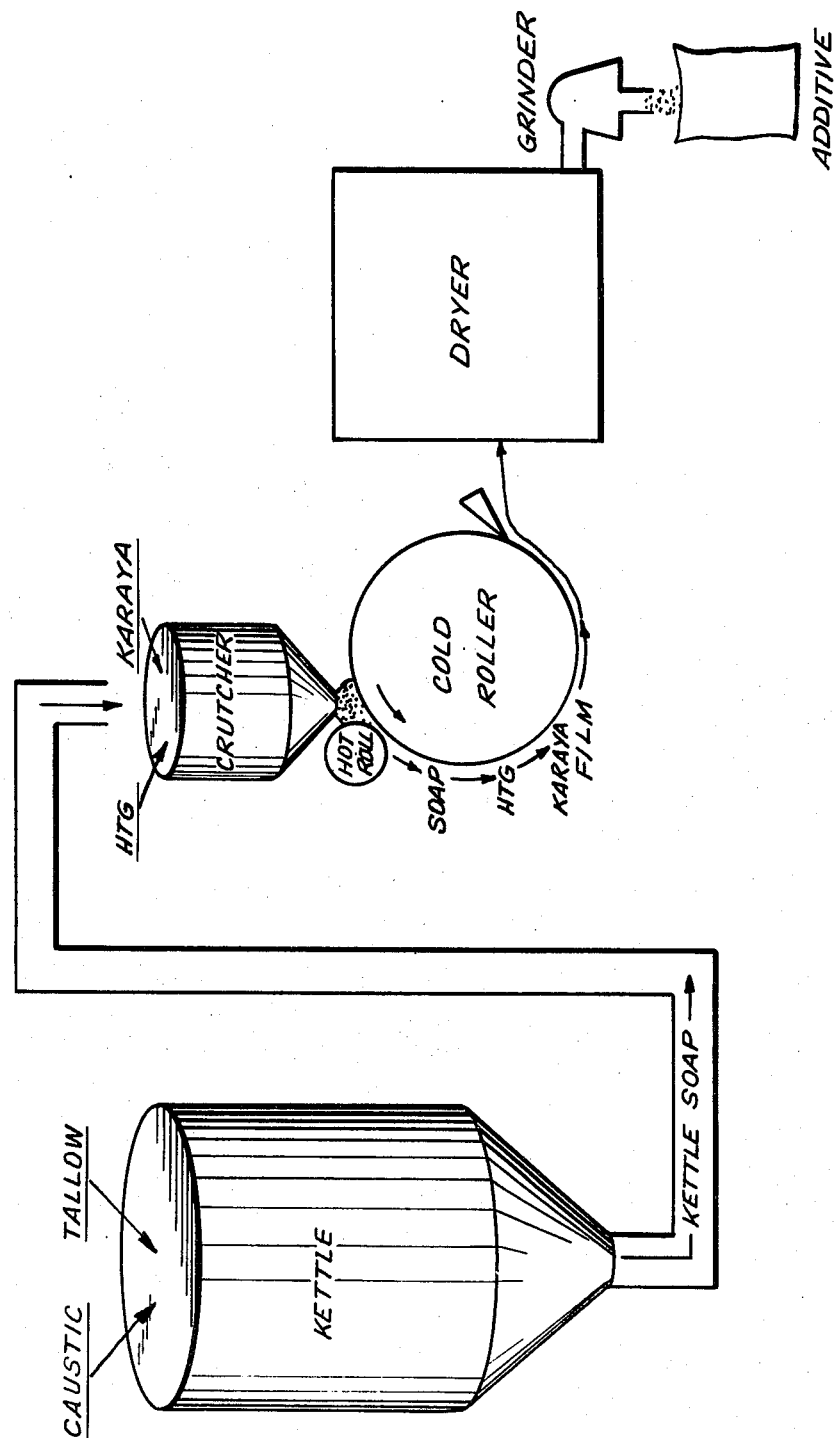

LUBRICANT-BINDER ADDITIVE FOR DENSIFYING ANIMAL FEED MATERIAL

BACKGROUND OF THE INVENTION

This invention relates to a lubricant-binder additive composition and method for densifying particulate solids and increasing their production rate without increasing the power utilized for densification.

A variety of products manufactured and sold today have a lumpy appearance, but are actually composed of finely divided particulate solids generally formed and compacted under high compressive pressures, and also elevated temperatures, to the desired size and shape. Such processes are broadly referred to as bulk densification. Bulk densification includes the well known processes of pelletization, extrusion, and the like. In these procedures, a primary objective is to obtain a durable, cohesive product which does not break down or disintegrate. A concomitant of these procedures is the relatively large power input required to form the product, often accompanied by a relatively low rate of production.

The products resulting from bulk densification can range in size from small pellets of rat bait and cat liter, usually about one half inch in length in their major dimension, to charcoal briquettes and hay cubes, usually about one to four inches in major dimension, to salt blocks which are usually longer than a foot in length and are used in cattle feeding.

Numerous proposals have been made to improve the bonding between bulk densified particles used in animal feeds, as well as for ways of decreasing power consumption and increasing production rate. Unfortunately, in many situations, an improvement in particle bonding is usually effected at the expense of increased power consumption and reduced production rate, or vice-versa. For example, additives which were found to act as lubricants during the pelleting or extruding steps to reduce power input, often resulted in diminished adhesion between the particles forming the final product.

For example, it is known that the use of vegetable and animal fats, and oils and mineral oils, individually or in combination, result in a substantial decrease in the durability of a bulk densified animal feed product. In order to be effective, that is in order to obtain a lubricating effect sufficient to result in power reduction and/or increased production, these materials generally had to be added in substantial amounts, i.e., from 1% to 2% by weight of the total feed. However, the high concentration of fat or oil additions generally results in a product of low cohesion. Furthermore, high concentrations of fat or oil in the final product are often undesirable for the ultimate product use. For example, high levels of mineral oil, in addition to lowering quality, yield an off color and unpalatable pellet. Tallow is not palatable to ruminants and in many cases excess use results in oily fat animals, such as hogs and chickens, wherein the meat has a greasy and unattractive texture. For this reason dairy feeds and steer feeds cannot use excessive levels of oil and tallow. Additionally, these materials' high viscosity generally makes it difficult to mix with the solid components being densified. Although oils will mix well, tallows are hard at ambient temperatures and require heat to blend into the feed.

Additives have also been utilized to improve the cohesiveness between the particles making up the densified product. These additives are referred to as binding agents. One commonly utilized binding agent for feed products or rat bait, is molasses. Unfortunately, molasses, when used as a binding agent, reduces lubrication and decreases production, resulting in increased power requirements and production costs.

Othe materials, such as clays, more specifically, attapulgite and bentonite, and lignin sulfonate, a byproduct of paper processing, are also effective binding agents, however, provide only a relatively small lubricating effect for the large amount of material to be densified. Generally, such materials must be present in amounts of at least 1% to 2% by weight of the total feed, and thus become a significant proportion of the densified product, but often contribute little in terms of food value of the feed. For example, in terms of a two ton feed batch, this can translate to 20 to 40 pounds of inert material, offering little or no food value.

The densified products described herein, wherein finely divided particles, or grains, are bound directly together by pressure during the pelleting operation must be distinguished from those other products also formed from finely divided particles, but wherein the particles are held within a matrix of a binding agent, such as gelatin, as disclosed for example in U.S. Pat. No. 2,593,577.

SUMMARY OF THE INVENTION

In accordance with the present invention, an improved method for densifying finely divided particles by compression into shaped forms, such as pellets, is provided, comprising contacting a mixed feed meal with a sufficient amount of an additive mixture comprising a fatty acid salt, a hydrogenated lipid and an anionic polymer and pressure forming the total feed mixture into the desired shape. The additive mixture of the present invention improves the durability of the pressure formed product by enabling the pressure forming operation to be conducted at significantly higher temperatures, thereby improving the bond between feed particles, and provides lubricant properties which significantly reduce the power requirements per unit yield of product. Production rates are also increased with a constant power input.

DETAILED DESCRIPTION OF THE INVENTION

The additive formulation of the present invention comprises a mixture of a salt of a fatty acid, a hydrogenated lipid, and a water soluble anionic polymer. The combination of additive components imparts physical characteristics to the finely divided particles to be densified, which provide superior lubrication and binding properties, especially for animal feed materials. These feed materials are intended to be used with animals raised commercially, or for use and are especially intended for domesticated quadrupeds, such as hogs, pigs, sheep, horses, cattle, rabbits, etc. and poultry, such as ducks, geese, turkeys, chickens, etc.

An important factor in utilizing the additive composition of the present invention is its particle size. Choice of the proper particle size provides a more effective distribution of the additive in the feed material.

It has been found that the improvements obtained from the use of the additive formulation become more significant when the additive has a particle size not greater than about minus 25 mesh, U.S. Sieve Scale, and preferably not smaller than about minus 75 mesh. Although there is no known minimum particle size, reduction in particle size substantially beyond minus 75 mesh causes a reduction in effectiveness and/or requires an increase in the amount of material necessary to achieve the desired results. Likewise, an increase in particle size can cause similar problems.

The salts of the common fatty acid component of the additive are monocarboxylic salts corresponding to the general formula:

$$(RCOO)_n X$$

wherein R is an aliphatic hydrocarbon containing 1-30 carbon atoms, more preferably 10-25; X can be sodium, potassium, calcium, zinc, iron, aluminum; and n=1 to 3.

The fatty acid salts suitable as ingredients in the present invention can come from fatty acids derived from most vegetable oils, such as soya, coconut, safflower, corn and the like. Soaps from these fatty acids are liquids due to their low degree of hydrogen saturation, and are excellent lubricants. Many of the glyceride emulsifiers such as sorbitan stearates, laurates, oleates and the like can also be used. Detergents derived from glycerides, dicarboxylic acids or synthetic fatty alcohols such as sodium lauryl sulfate will also function. Most preferable are the salts derived from fatty acids found in animal tallow, better known as lye or tallow soap. Tallow soap, also known as high titre soap, is the highest melting of the true soaps. This is due to the neutralization of high concentrations of stearic and palmitic acids with sodium ions to achieve a titre level of 41-43. When finished in the powdered form, high titre soap is between 92 and 96 percent anhydrous.

The hydrogenated lipids include synthetic chocolates (hardened fats and oils), margarines (hydrogenated corn oil) and the like. In addition, hard fatty acids, such as stearic, hydrogenated palmitic, oleic acids and the like, are also suitable. Most preferable is hydrogenated tallow glyceride (HTG), a tallow hardened by hydrogenating double bonds existing in the fatty acids contained in the tallow. This serves to raise the melting point by saturating each fatty acid chain with hydrogen. HTG has a titre value of approximately 58 and an acid value of 1.4. The acid value is determined by the number of milligrams of potassium hydroxide neutralized by the free acids in one gram of lipid. For example, 1.4 milligrams of KOH are neutralized by one gram of HTG. Physical characteristics of the material are similar to that of hard paraffin. Synthetic fatty alcohols, $C_nOH$, while not lipids, are good substitutes for HTG, especially where n is equal to or greater than 16.

The water soluble anionic polymers most suitable are those tolerant to an alkaline pH, preferably above 9. These include alkali carboxymethylcelluloses (CMC) such as sodium, xanthan, most galactomannans such as locust bean, guar, and the like, and aliginates, carrageenans and the like.

A preferred anionic polymer is polyacrylamide. Polyacrylamide is an anionic polymer of the acrylic acid-acrylamide resin family. Most desirably, the polyacrylamide used in this invention will contain less than two percent free acrylic acid monomer as required by the U.S. Food and Drug Administration in order to qualify as an additive for animal feed. However, should they be available for use in feed, polyacrylamides with higher levels of free acrylic acid monomer will also perform well in the additive composition.

Another preferred anionic polymer is karaya gum, also known as gum karaya, kadaya, katilo, etc. Karaya gum is a partially acetylated polysaccharide containing about 8% acetyl groups and about 37% uronic acid residues.

When the three additive components are combined, they result in a product containing a water soluble phase (anionic polymer), a water and oil soluble phase (fatty acid salt), and a water insoluble phase (hydrogenated lipid).

In a preferred embodiment, the additive mixture will include polyacrylamide and/or gum Karaya, tallow soap and HTG. Both the tallow soap and the HTG will melt within the range of densification or pelleting temperatures which range from about 100° F. to about 200° F., more preferably from about 130° F. to about 180° F. The tallow soap will also hydrate in the presence of moisture. All of these features enable the additive mixture to liquefy under the bulk densification operating conditions.

An excellent lubricant, the tallow soap also functions as an emulsifier between solubilized polyacrylamide and/or gum Karaya, and the molten HTG. The polyacylaminde or gum Karaya functions as a thickener and stabilizer for the additive mixture, preventing penetration of the additive into the feed particles.

In the additive mixture, the HTG melts to form a rather viscous liquid and acts to prevent overdilution or washing away of the lubricant film by moisture. HTG also increases the durability of the lubricant film on the feed particles.

The additive combination of HTG and soap provides excellent lubrication at normal densification temperatures which vary from about 100 to 200° F., most preferably, 130–180° F.

As has already been noted, the additive components of the present invention provide outstanding lubricating properties to animal feeds in or out of aqueous systems. The proper amount of each additive component is dependent upon the analysis and nature of the particular feed system being densified, temperature, pressure, and the like.

In general, the total amount of additive can vary from about 0.01% to about 0.2%, more preferably from about 0.05% to about 0.1%, by weight of the total feed material. Greater amounts can also be used, however, no additional advantages are accrued thereby.

The proportions of fatty acid salt, hydrogenated lipid and anionic polymer will generally vary in the ratio of about 90:40:15 to about 50:1:0.5, more preferably about 88:20:5 to about 75:5:1, respectively, in parts by weight of the additive.

In one embodiment, the anionic polymer and HTG are contacted with an unfinished, molten tallow soap base containing 65% anhydrous soap and 35% water. This can be accomplished by mixing an aqueous slurry of melted HTG and anionic polymer. The resulting mixture thickens as the polymer partially hydrates in the water. It is then cooled, solidified, dried, and ground to the desired particle size according to standard soap finishing procedures.

Combining the additive ingredients in this manner has distinct advantages over dry blending each ingredient for the following reasons: (1) Stratification and separation of ingredients are prevented; (2) HTG melted together with tallow soap results in a product with a lower melting point than either HTG or tallow soap by itself; (3) The polymer is partially hydrated in the unfinished soap leading to more rapid hydration in the conditioning chamber of the pellet mill.

Basic soap manufacturing technique is an acceptable procedure employed to manufacture the soap-HTG-polymer formula. As illustrated in the figure, tallow soap is formed through neutralization of tallow fatty acids by sodium hydroxide. To accomplish this liquid tallow is saponified, i.e. fractionated into its glycerol and fatty acid components and washed to remove the glycerin. Fractionation of tallow is also accomplished through use of caustics like sodium and/or potassium hydroxides. After the removal of glycerins, neutralization of fatty acids continues until salts of these fatty acids are formed. The remaining solution, referred to as kettle soap, is allowed to "cure" until its temperature drops to a range of about 160° F. to 200° F., and the water content reaches approximately 32% by weight. Because saponification of tallow and neutralization of fatty acids is always performed at or near the boiling point of water, curing of kettle soap is necessary to insure that the neutralization reactions are complete and to allow the soap to cool so that it can be handled more easily.

The kettle soap is then pumped into mixing tanks known as crutchers. These crutchers can agitate the hot, liquid soap. It is at this point that the addition of further ingredients such as Karaya gum and HTG is most convenient. Addition of ingredients to the crutchers provides for a uniform liquid product to be produced, dried and ground without separation in the dry stage.

Exiting the crutchers, the soap is prepared for drying by coating a film of the kettle soap on a large, water cooled roller where it "freezes" and is scraped off in the form of thin ribbons. These ribbons then pass through a dryer, such as a convection dryer, at a temperature of about 170° F. and the remaining moisture is driven from th soap.

The above described method of manufacture enables partial hydration of the Karaya gum in th soap solution which results in faster hydration of the polymer component in the conditioning chamber of the pellet mill.

Another drying mechanism is also available to the soap industry. Rather than freezing soap on a cold roller the soap is filmed onto a hot roller from which the moisture is baked. Dried soap is then scraped from the roller and ground. In industry, these are called "film drum dryers".

The densification of the feed material generally includes a preconditioning operation wherein the animal feed particles are mixed with an aqueous diluent. The animal feed particle size most suitable for densification will vary depending upon various factors, such as the composition, type of feed, operating conditions, and the like. These determinations and the factors which influence them are familiar to those skilled in the art. Nevertheless, a suitable particle size range for animal feeds can vary from about ⅛ inch to about 300 mesh, preferably from about ⅛ inch to about 100 mesh.

The use of an aqueous diluent provides a means for efficient and economical distribution of the additive in liquified form throughout the particulate animal feed system. Steam is an excellent means for distributing the additive combination. Steam also serves to activate the additive combination by dissolving and extending it throughout the feed. The steam temperature can generally vary from 212 to 300+ F. for most efficient operation. The steam is applied until the moisture content of the feed mixture ranges from about 8 to about 17%, preferably from about 10 to about 15%, by weight of the total feed composition. The moistened feed particles are then mechanically forced through a die opening to form pellets which are cooled and dried, preferably by a stream of air. The pellets are then packaged and stored or shipped accordingly.

The preconditioning operation is most preferably carried out on the feed material and additive which have been previously mixed together. As will be apparent to those skilled in the art, this operation can also be accomplished by diluting the additive and feed material separately, then mixing together, or in any sequence most convenient for the practitioner.

Generally, in the standard pelleting operation, corrugated rollers force the finely divided particles through a die opening to form the pellet. During this operation the finely divided particles of feed material are compacted together and are forced to slide through the die under pressure, resulting in substantial frictional forces being exerted against the material. The incorporation of the additive composition of the present invention in the feed material substantially reduces these frictional forces. This increases pellet production and results in a more durable and higher quality pellet.

The additive composition of the present invention can be subjected to compression either in a closed mold or in passage through a die to produce a compacted, pressure formed product having a predetermined configuration and a cohesive, integral structure. Such procedures include, in addition to pelleting, briquetting, extrusion, compression molding and the like.

To ensure that cattle are fed a nutritious, well-rounded diet, it is common practice to prepare a pelleted feed material formed from a combination of particulate granular materials containing the desired nutritional values. One commonly available and commercially used pelleting mill operates as follows:

Granular solids are mixed together in a 4000 lb batch capacity ribbon mixer for about 5 minutes. The mixed solids are transferred to a storage bin where they are fed into a conditioning chamber and contacted with 60 psig steam for 30 seconds. The mixed solids exiting the conditioning chamber are at a temperature varying from 100–170° F. and have a moisture content of from about 10 to about 15%, by weight. The conditioned feed, or mash is fed to stationary rollers which force the mash through circular, spinning die openings to compress the solids into pellets. Usually, the heat rise during passage through the die is about 20° F. The pelleted material leaving the die is then air cooled and dried.

General techniques for pelleting animal feed are contained in the booklet "Pelleting Animal Feed", published by the American Feed Manufacturers Association, 1701 N. Ft. Meyer Drive, Arlington, Virginia 22209.

Pelleted cattle feed is often subjected to rather rough handling during storage, transportation and dispersion by the farmer in the fields. Accordingly, the pellets have to be sufficiently hard and durable to withstand rough handling without disintegrating into undesirable fines, which do not retain the total combination of nutrients and, which are difficult for cattle to feed upon. A standard test for durability is the "tumbling can" method, wherein a 500gram sample of the pellets is tumbled for 16½ minutes in a 12 inch by 12 inch by 5 inch rectangular box revolving at 30 revolutions per minute (rpm), about a single transverse axis, i.e. the axis is perpendicular to the long dimensions of the can and passes through the midpoint of the can between the axis. Following the tumbling, the pellets are removed, passed through a screen having openings of about ⅛ inch to separate out the fines and weighed. The standard value PDI (Pellet Durability Index) is obtained by the following formula:

$$PDI = \frac{\text{Screened pellets (less fines)}}{\text{Original sample weight}} \times 10$$

The higher the PDI value, the more durable the pelleted product.

The following examples set forth specific embodiments of the invention and are not intended to be exclusive of its scope. All parts and percentages are by weight unless otherwise noted.

EXAMPLE 1

Two tons of 16% natural protein pellets were milled at a mill speed setting of three turns of a Reeves drive mechanism and at a conditioning temperature of 188° F. The pellets had the following composition:

| | |
|---|---|
| Cottonseed Meal | 7.3% |
| Wheat Middlings | 20.9 |
| Corn Gluten Meal | 5.2 |
| Corn | 10.4 |
| Soy Bean Meal | 9.4 |
| Corn Screenings | 28.3 |
| Dicalcium Phosphate | 0.5 |
| Hominy Meal | 15.6 |
| Molasses | 2.1 |
| Trace minerals | 0.05 |
| Vitamin A & D | .25 |
| | 100.0% |

The pellets were produced from a ½ inch die and had a PDI value of 9.12 or 91.2% quality pellets.

An identical two ton batch of pellets were manufactured with the addition of 0.05% by weight, of the following additive formulation:
1. 85% tallow soap*
2. 13% Glycon HTG - hydrogenated tallow glycerides**
3. 1% Polyhall 295 PW$^{TM}$*** - polyacrylamide Mill speed and conditioning temperature were held identical to those recorded in the control run. A marked decrease in power requirements resulted from the addition of the lubricating agent. With this feed formula, a power reduction of 14% was achieved. Results appear in TABLE 1.

* National Purity Soap and Chemical Co. Minneapolis, Minn.
** Glyco Chemical Co., Greenwish, Conn.
*** Stein-Hall and Co., Louisville, Ky.

TABLE 1

| Additive | Conditioning Temperature ° F. | Mill speed (Turns of Reeves Drive setting) | Amperes | PDI |
|---|---|---|---|---|
| Control | 188 | 3 | 119 | 9.12 |
| HTG - tallow soap - polyacrylamide | 188 | 3 | 102 | 9.22 |

EXAMPLE 2

Three two ton batches of a dairy feed similar to the 16% natural protein pellets of Example 1 were pelleted through a 3/16 inch die with the following additions:
Batch 1: 2 tons as a control (without any additive).
Batch 2: 2 tons with the addition of 2 pounds of 75% tallow-soap-25% HTG.
Batch 3: 2 tons with the addition of 2 pounds of 85% tallow soap, 13% HTG, and 1% polyacrylamide.

Batch 2 containing HTG and tallow soap enabled the mill to run 15° F. hotter and 30% faster than the control Batch 1. Batch 3 with polyacrylamide, HTG and tallow soap enabled the mill to run 35° F. hotter than the control. The mill speed was 30% faster than the control, and the PDI of Batch 3 showed a marked improvement over Batches 1 and 2. Results appear in Table 2.

TABLE 2

| Additive | Conditioning Temperature ° F. | Mill Speed (Reeves Setting) | Amperes | PDI |
|---|---|---|---|---|
| Control | 135 | 3.7 | 95 | 9.6 |
| HTG-tallow soap | 150 | 4.8 | 96 | 9.6 |
| HTG-tallow soap-polyacrylamide | 160 | 4.8 | 94 | 9.76 |

EXAMPLE 3

Three batches, each weighing two tons, of high corn content feed (4563 Hog Finisher - Indianapolis Farm Bureau) were pelleted through a ¼ inch die in a 150 horsepower California Pellet Mill (CPM). The feed had the following composition:

| | |
|---|---|
| Wheat Middlings | 10.2% |
| Corn | 39.4 |
| Meat Meal | 1.0 |
| Sample Grade Corn | 25.4 |
| Dicalcium Phosphate | .5 |
| Hominy Meal | 12.4 |
| Soya Bean Meal | 9.9 |
| Trace Minerals | .05 |
| Swine Additive mix (vitamins) | .15 |
| Molasses | 1.0 |
| | 99.01% |

Batch 1, the control, contained no binder additive. Batch 2 contained 80 lbs of Masonex$^{TM}$, a lignin sulfonate based binder. Batch 3 contained 2 lbs of 13% HTG, 86% tallow soap and 1% polyacrylamide.

The results shown in TABLE 3 demonstrate the ability of the present invention to attain a higher pelleting temperature, higher mill speed, with lower power requirements and more durable pellets.

TABLE 3

| Additive | Maximum Temperature (°F.) | Mill Speed (Reeves Setting) | Amperes | PDI |
|---|---|---|---|---|
| Control | 152 | 2.5 | 75 | 8.7 |
| Masonex | 178 | 2.5 | 90 | 9.44 |
| HTG, tallow soap, polyacrylamide | 198 | 3.0 | 75 | 9.46 |

EXAMPLE 4

Two three ton batches of a dairy feed containing 9% molasses were pelleted in a 55hp Simon-Baron pellet mill producing a 5/16 inch pellet. Batch 1, the control, contained no binding additive. Batch 2 contained 2 lbs of an additive having the following composition:
82 parts tallow soap
13 parts HTG
5 parts gum Karaya Power consumption, mill speed and feed temperature were recorded. Results appear below in Table 4.

TABLE 4

| Batch | Temperature (° F.) | Mill Speed (Reeves Setting) | Ampere | PDI |
|---|---|---|---|---|
| 1 (Control) | 132 | 4.7 | 55 | 9.50 |
| 2 | 140 | 4.7 | 42 | 9.75 |

The results demonstrate the ability of the additive to enable pelleting of the feed at a higher temperature than the control. Additionally, use of the lubricant-binder additive of the present invention enabled pelleting at less power consumption. The feed pelleted with the additive was also of a higher quality, as evidenced by the higher PDI.

What is claimed is:

1. In an animal feed composition intended for domesticated quadrupeds and poultry, the improvement which comprises the inclusion of a lubricant-binder additive composition comprising a mixture of:
   (a) a salt of a fatty acid;
   (b) a hydrogenated lipid; and
   (c) a water soluble anionic polymer;
   wherein the fatty acid salt varies from about 90 to about 50%, the hydrogenated lipid varies from about 40 to about 1%, and the anionic polymer varies from about 15 to about 0.5%, by weight of the additive composition; and
   wherein said additive composition varies from about 0.01 to about 0.2% by weight of the total composition.

2. The animal feed composition of claim 1 wherein said animal feed composition comprises ingredients selected from the group consisting of:
   cottonseed meal, wheat middlings, corn gluten meal, corn, soy bean meal, corn screenings, hominy meal, meat meal, vitamins, minerals, and mixtures thereof.

3. The animal feed composition of claim 1 wherein said additive composition varies from about 0.05 to about 0.1%, by weight of the total feed material.

4. The animal feed composition of claim 1 wherein the salt of a fatty acid corresponds to the formula:

$$(RCOO)_nX$$

wherein R is an aliphatic hydrocarbon containing 1 to 30 carbon atoms; X is selected from sodium, potassium, calcium, zinc, iron, aluminum, and mixtures thereof; n equals 1 to 3.

5. The animal feed composition of claim 4 wherein R contains 10 to 25 carbon atoms, and X is selected from sodium potassium and mixtures thereof.

6. The animal feed composition of claim 4 wherein said fatty acid salt is a soap derived from a vegetable oil, glyceride or animal tallow.

7. The animal feed composition of claim 6 wherein said fatty acid salt is tallow soap.

8. The animal feed composition of claim 1 wherein said hydrogenated lipid is selected from hardened fats and oils.

9. The animal feed composition of claim 8 wherein said hydrogenated lipid is selected from synthetic chocolates, margarines, and hydrogenated tallow glycerides.

10. The animal feed composition of claim 9 wherein said hydrogenated lipid is hydrogenated tallow glyceride.

11. The animal feed composition of claim 1, wherein said hydrogenated lipid is selected from the group consisting of stearic, palmitic, and oleic acids.

12. The animal feed composition of claim 1 wherein said water soluble anionic polymer is tolerant to an alkaline pH.

13. The animal feed composition of claim 12 wherein said pH is above 9.

14. The animal feed composition of claim 12 wherein said anionic polymer is selected from carboxymethylcellulose, gum Karaya, xanthan, galactomannans, alginates and carageenans.

15. The animal feed composition of claim 1 wherein said anionic polymer is polyacrylamide.

16. The animal feed composition of claim 14 wherein said anionic polymer is gum Karaya.

17. The animal feed composition of claim 1 wherein a synthetic fatty alcohol having a carbon chain length greater than 16 is substituted for the hydrogenated lipid.

18. The animal feed composition of claim 1 distributed in said feed material by means of an aqueous diluent.

19. The animal feed composition of claim 18 wherein said aqueous diluent is steam.

20. The animal feed composition of claim 1 wherein said fatty acid salt varies from about 88 to about 75%, the hydrogenated lipid varies from about 20 to about 5%, and the anionic polymer varies from about 5 to about 1%, by weight of the total additive composition.

21. The animal feed composition of claim 1 having a particle size varying from about minus 25 mesh to about minus 75 mesh, U.S. Sieve Scale.

22. A lubricant-binder additive composition included in a pressure formed finely divided animal feed material intended for domesticated quadrupeds and poultry, said additive composition having a particle size varying from about −25 to about −75 mesh, U.S. Sieve Scale, and comprising a mixture of:
   (a) tallow soap;
   (b) hydrogenated tallow glycerides; and
   (c) polyacrylamide or gum Karaya, or both;
said additive composition being present in the total feed material and varying from about 0.01 to about 0.2% by weight of the total feed material, and wherein the ratio of (a):(b):(c) varies from about 90–75:20–10:15–1, respectively, in parts by weight.

23. A method for densifying particulate, granular animal feed material, intended for domesticated quadrupeds and poultry, into a predetermined, cohesive shape comprising contacting said feed material with a sufficient amount of a lubricant-binder additive composition comprising a mixture of a fatty acid salt, a hydrogenated lipid, and a water soluble anionic polymer,
   wherein the fatty acid salt varies from about 90 to about 50%, the hydrogenated lipid varies from about 40 to about 1%, and the anionic polymer varies from about 15 to about 0.5%, by weight of the additive composition;
   and pressure forming the feed material to the predetermined shape.

24. The method of claim 23, wherein said additive composition varies from about 0.01 to about 0.2% by weight of the total feed material.

25. The method of claim 24, wherein said additive composition varies from about 0.05 to about 0.1%, by weight of the total feed material.

26. The method of claim 23, wherein said fatty acid salt is a soap derived from a vegetable oil, glycerides, or animal tallow.

27. The method of claim 26, wherein said fatty acid salt is tallow soap.

28. The method of claim 23, wherein said hydrogenated lipid is selected from synthetic chocolates, margarines, and hydrogenated tallow glycerides.

29. The method of claim 28, wherein said hydrogenated lipid is hydrogenated tallow glyceride.

30. The method fo claim 23 wherein said hydrogenated lipid is selected from the group consisting of stearic, palmitic and oleic acids.

31. The method of claim 23, wherein said water soluble anionic polymer is tolerant to a pH above 9.

32. The method of claim 23, wherein said anionic polymer is selected from carboxymethylcellulose, gum Karaya, xanthan galactomannans, alginates and carageenans.

33. The method of claim 23, wherein said anionic polymer is polyacrylamide.

34. The method of claim 32, wherein said anionic polymer is gum Karaya.

35. The method of claim 23, wherein said additive composition is distributed in said feed material by means of an aqueous diluent.

36. The method of claim 35, wherein said diluent is steam.

37. The method of claim 23, wherein the moisture content of the total feed material prior to pressure forming varies from about 8 to about 17%, by weight.

38. The method of claim 23, wherein the particle size of the additive composition varies from about minus 25 mesh to about minus 75 mesh, U.S. Sieve Scale.

39. The method of claim 23, wherein said predetermined shape is a pellet.

40. A method for pelletizing particulate, granular animal feed material intended for domesticated quadrupeds and poultry comprising:
contacting said fee material with a lubricant-binder additive composition comprising a mixture of
(a) tallow soap;
(b) hydrogenated tallow glycerides; and
(c) polyacrylamide or gum Karaya, or both;
in the presence of steam and pressure forming the total feed material into pellets; said additive composition having a particle size varying from about minus 25 mesh to about minus 75 mesh, U.S. Sieve Scale and varying from about 0.1 to about 0.2% by weight of the total feed material, and wherein the ratio of (a):(b):(c) varies from about 90–75:20–10:-15–1, respectively, in parts by weight.

* * * * *